United States Patent [19]

Bloomer

[11] Patent Number: 5,230,654
[45] Date of Patent: Jul. 27, 1993

[54] DIFFUSER AIR OUTLET REGISTER

[75] Inventor: Stephen F. Bloomer, Lambeth, Canada

[73] Assignee: Siemens Automotive Limited, Chatham, Canada

[21] Appl. No.: 906,611

[22] Filed: Jun. 30, 1992

[51] Int. Cl.$^5$ ............................................. B60H 1/24
[52] U.S. Cl. ................................... 454/155; 454/319; 454/314
[58] Field of Search ............... 454/155, 313, 314, 319, 454/320

[56] References Cited

U.S. PATENT DOCUMENTS 4,970,947 11/1990 Soethout ............................. 454/155
5,036,753 8/1991 Ostrand et al. ..................... 454/155

*Primary Examiner*—Harold Joyce
*Attorney, Agent, or Firm*—George L. Boller; Russel C. Wells

[57] ABSTRACT

Each vertical vane contains two vane groups that are independently pivotable about their co-axis. A push button control mechanism selects between a jet setting in which both vane groups are parallel and a diffuse setting in which the two vane groups are non-parallel. The mechanism has a detent feature that keeps the diffuse setting until released.

3 Claims, 5 Drawing Sheets

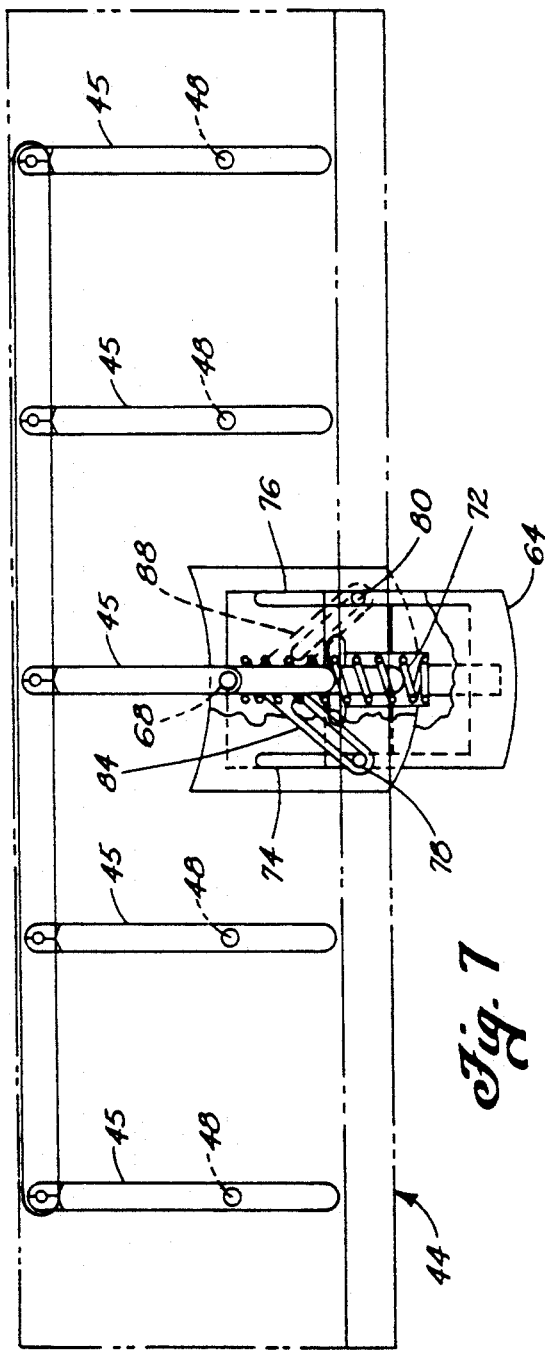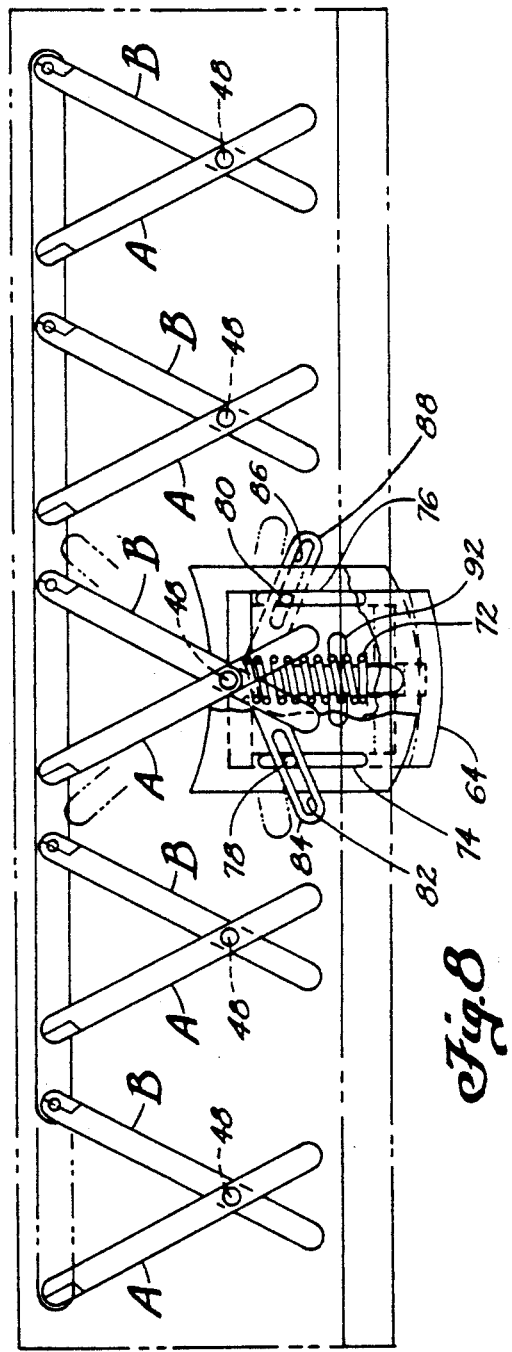

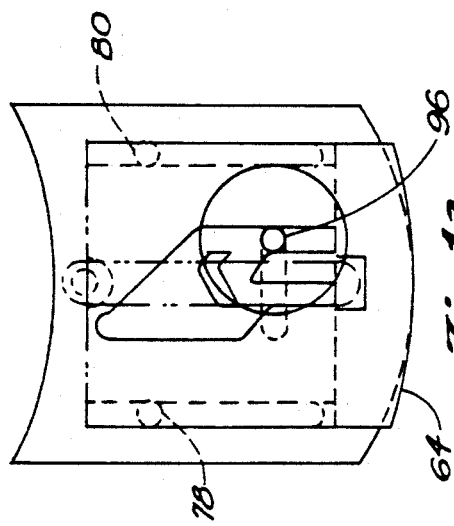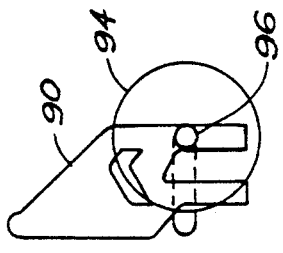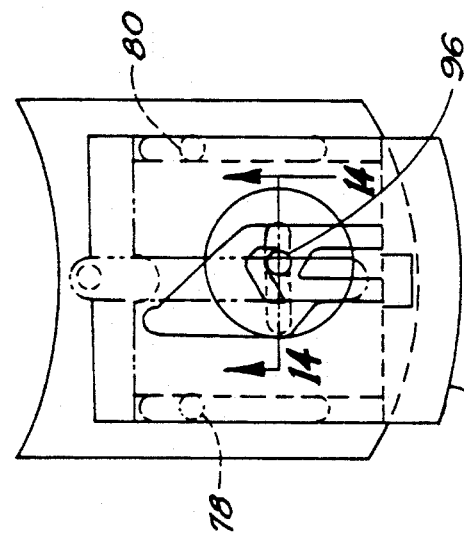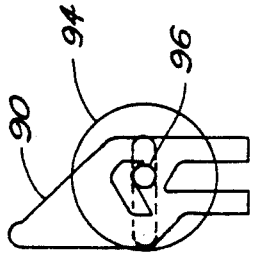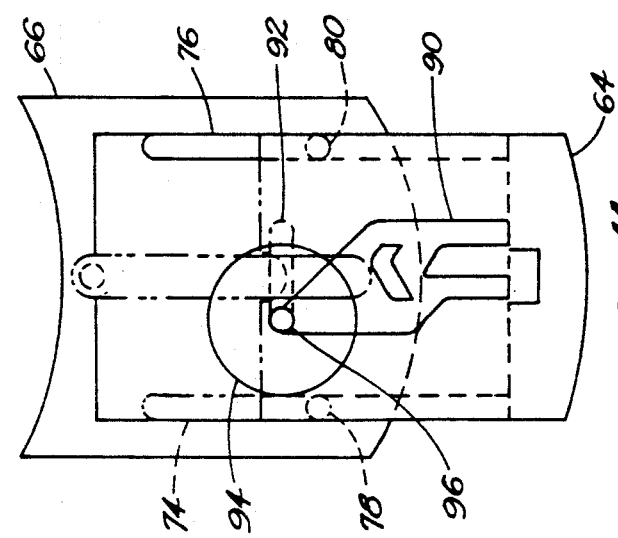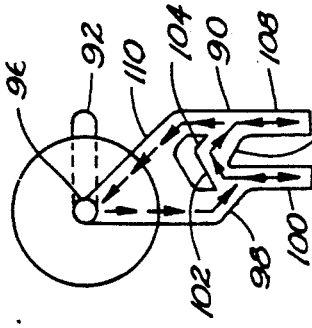

DIFFUSER AIR OUTLET REGISTER

FIELD OF THE INVENTION

This invention relates to air outlet registers of the type that are commonly used in the instrument panels of automotive vehicles for directing heated, air-conditioned, or fresh air toward the front seat occupants.

BACKGROUND AND SUMMARY OF THE INVENTION

Traditionally such air outlet registers have utilized parallel rotating vanes to direct the airflow into the vehicle's interior. These vanes rotate in unison and direct the flow in a concentrated stream or jet to wherever directed. This jet of airflow from each outlet may be required to maintain the passenger compartment at a desired temperature setting, but because of the high localized velocity and the inability of most vehicle air distribution systems to allow the flow to be directed away from the occupants, it may cause discomfort due to localized hot or cold airflow on the occupants' bodies.

The present invention relates to a new and unique air outlet register that enables the volume flow to be maintained, but with a diffuse, rather than a jet flow, so that high velocity impingement on occupants can be avoided. The invention allows selective adjustment of a register to a jet setting for initial cool down or heat up and to a diffuse setting for temperature maintenance without blasting on the occupants. This capability is attained without significantly increasing the back pressure on the blower and without significantly increasing aerodynamically generated noise.

Principles of the invention will be perceived by reading the ensuing description of a presently preferred embodiment of the invention according to the best mode contemplated at this time for carrying out the invention. Drawings accompany the disclosure as follows.

BRIEF DESCRIPTION OF THE DRAWINGS

FIG. 7 is a view corresponding to FIG. 4 and of a less schematic nature. It is taken generally in the direction of arrows 7—7 in FIG. 9.

FIG. 8 is a view corresponding to FIG. 6 and of a less schematic nature.

FIGS. 11, 12 and 13 are plan views, somewhat diagrammatic, of the control mechanism in different positions of operation.

FIGS. 11A, 12A and 13A are views corresponding to FIGS. 11, 12 and 13 useful in understanding the views of FIGS. 11, 12 and 13.

FIG. 14 is a fragmentary sectional view in the direction of arrows 14—14 in FIG. 12A.

DESCRIPTION OF THE PREFERRED EMBODIMENT

Figures 1, 2:
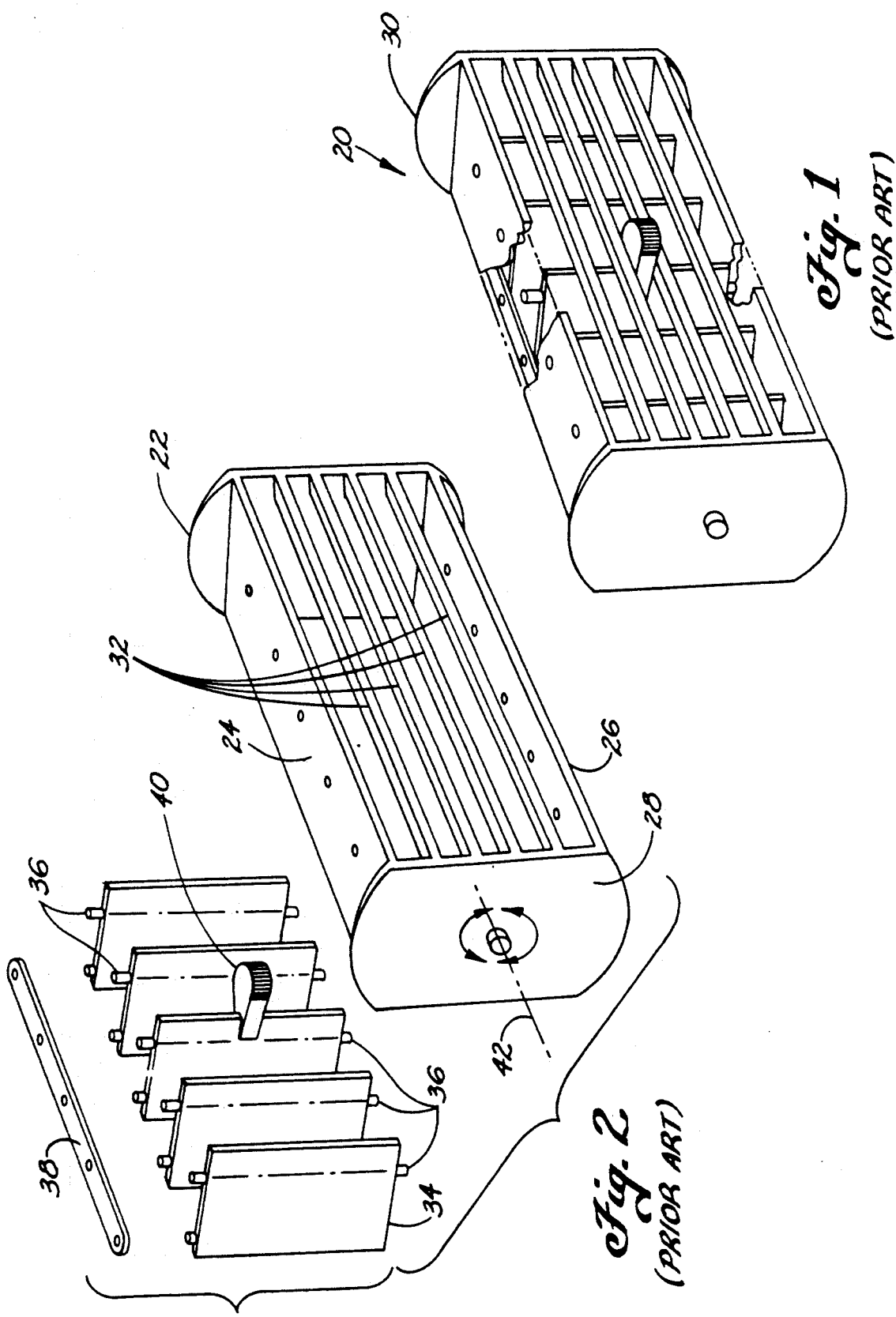
FIG. 1 is an exploded perspective view of a traditional air outlet register of the type to which the present invention relates.
FIG. 2 is a perspective assembly view.

A known air outlet register 20 is presented in FIGS. 1 and 2. It comprises a generally rectangular perimeter frame, or barrel, 22 that has a top wall 24, a bottom wall 26, and side walls 28, 30 that define a generally rectangular opening through which airflow passes. A series of fixed horizontal vanes 32 extend across the front of the opening. A series of vertical vanes 34 extend across the back of the opening. Vanes 34 are pivotally mounted on frame 22 for pivoting about respective parallel axes 36. Vanes 34 are arranged parallel and linked together by a tie bar link 38 for pivotal motion in unison about their respective axes 36. A control knob 40 having a serrated arcuate face is centrally disposed on the middle vane 34 so as to present itself between the two middle vanes 32 at the front of the opening. Knob 40 is pushed to either the right or left to similarly direct the airflow out of the register via the front of the opening. Frame 22 is itself disposed within a further frame (not shown) for pivotal motion about a horizontal axis 42 to direct the airflow up or down. FIG. 1 is intended to shown the vanes both mutually parallel and parallel with side walls 28 and 30 so that air is discharged generally straight away from the register, as opposed to either the right or left.

Figure 3:
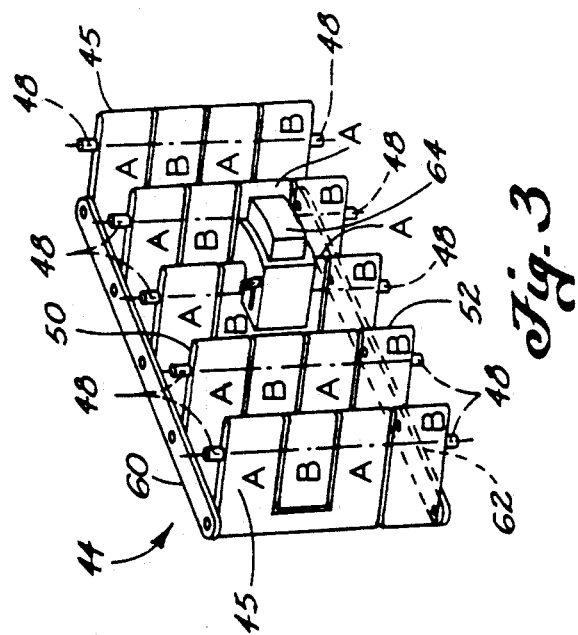
FIG. 3 is a perspective view, somewhat schematic in nature, of a portion of the mechanism of an air outlet register according to the present invention.

The inventive air outlet register 44 is shown in the remaining drawing Figures. As an aid to understanding the inventive principles, attention is first directed to FIGS. 3-6. The movable portion of the register is shown in FIG. 3 and comprises a number of vanes that are mounted within the opening of a perimeter frame 46 (shown in phantom in FIGS. 4-6) for pivotal motion about respective parallel vertical axes 48. Each vertical vane is actually two separate vane elements that are arranged for independent pivotal motion about the corresponding axis 48. One vane element of each vane is designated by the letter "A" while the other vane element of each vane is designated by the letter "B". As perhaps best seen in FIGS. 9 and 10, each vane element has a general "C" shape, comprising two main vane portions of substantially equal size (50 in the case of vane elements "A", 52 in the case of vane elements "B") connected together by a vertical web (54 in the case of vane elements "A", 56 in the case of vane elements "B"). The center vane is different in that the upper portion 52 of its vane element "B" and the lower portion 50 of its vane element "A" contain rectangular notches at their front lower and upper corners respectively to provide space for a control mechanism 58 that will be described in greater detail later on. Vane elements "A" are linked together at the rear of their top edges by a tie bar link 60 for pivotal motion in unison about their respective axes 48. Similarly, vane elements "B" are linked together at the rear of their lower edges by a tie bar link 62 for pivotal motion in unison about their respective axes 48.

Figure 4:
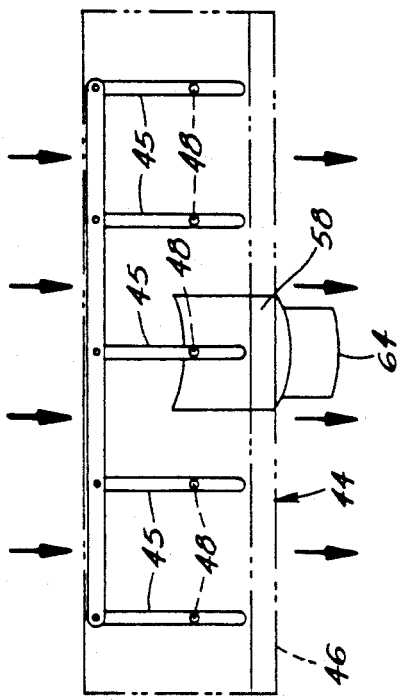
FIG. 4 is a top plan view of the mechanism of FIG. 3 in schematic form and illustrating the mechanism in the jet setting with the vanes positioned to direct the airflow straight outwardly.
Figure 5:
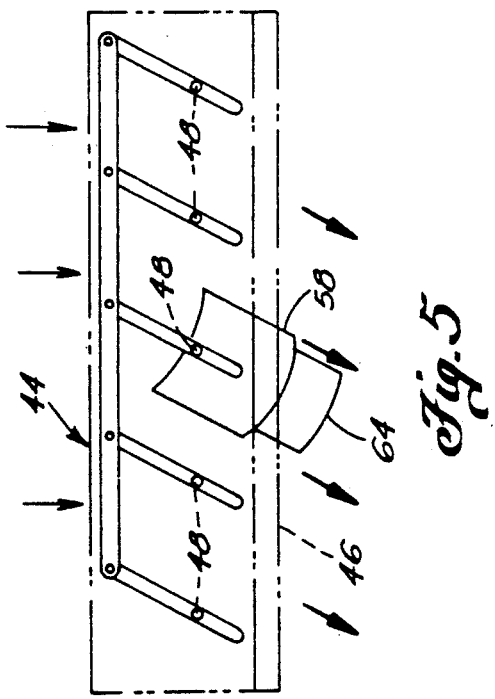
FIG. 5 is a view like FIG. 4, but with the vanes positioned to direct the airflow at an angle.

FIG. 4 shows the vanes in planes that are parallel both mutually and with the side walls of frame 46 so that they direct the airflow straight out of the opening. Pushing control mechanism 58 to either the right or the left will pivot the vanes in unison to similarly direct the airflow. Thus, FIG. 5 shows control mechanism 58 having been pushed to the left from the center position of FIG. 4 to cause the vanes to be pivoted such that the airflow is directed to the left, and it can be readily appreciated that pushing control mechanism to the right will cause the airflow to be directed to the right. The positions of the vanes in both FIGS. 4 and 5 depict the "jet" setting of the mechanism wherein all vane elements are mutually parallel.

Figure 6:
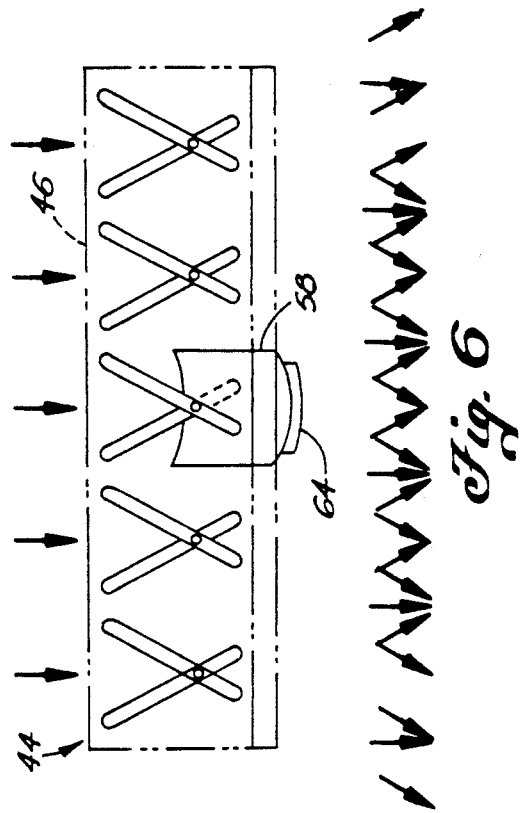
FIG. 6 is a top plan view of the mechanism of FIG. 3 in schematic form and illustrating the mechanism in the diffuse setting.

FIG. 6 depicts the "diffuse" setting of the mechanism wherein vane elements "A" are non-parallel to vane elements "B" although the individual vane elements "A" remain mutually parallel as do the vane elements "B". The diffuse setting is attained by positioning the vanes to approximately the position of FIG. 4 and then depressing a push button 64 of control mechanism 58. Depressing push button 64 causes vane elements "A" to pivot some 30-35 degrees counterclockwise as viewed in top plan view and vane elements "B" to pivot a similar amount in the clockwise sense. This positioning of the vane elements diffuses the exiting airflow. It should be understood that this particular amount of pivoting is merely representative and that a mechanism may be designed for a different amount of pivoting.

Control mechanism 58 serves to operatively couple push button 64 with vanes 45 for selecting either the jet setting or the diffuse setting. Control mechanism 58 has a housing 66 that guides the push buttons motion. A vertical hole 68 passes completely through the rear of housing 66. A shaft 70 that provides the pivot axis 48 for the center vertical vane 45 passes through hole 68. A helical coil spring 72 is disposed interiorly of housing 66 between the rear housing wall and the rear of push button 64 to bias the push button in the direction out of the housing. The top wall of housing 66 contains a slot 74 that is parallel to the travel of push button 64. The lower housing wall contains a slot 76 diagonally opposite slot 74, and it is also parallel to the push button travel. A vertical cylindrical pin extends upwardly from push button 64 interiorly of housing 66 and passes outwardly through slot 74. Similarly, a second cylindrical pin 80 extends downwardly interiorly of housing 66 and passes outwardly through slot 76. On the exterior of housing 66, pin 78 passes through a slot 82 in an outrigger 84 that is an integral formation with vane element "B" of the center vertical vane 45. Likewise, on the exterior of housing 66, pin 80 projects through a slot 86 in an outrigger 88 that is integrally formed with vane element "A" of the center vertical vane 45.

Figure 9:
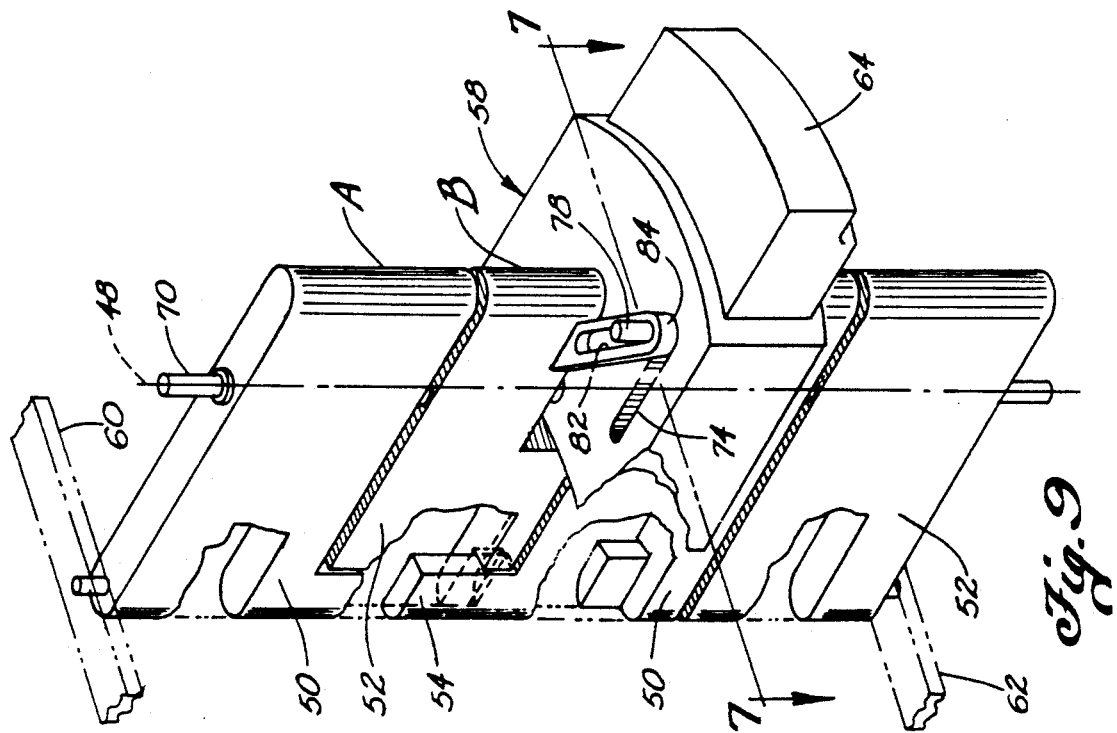
FIG. 9 is a perspective view of a center portion of the mechanism in the jet setting. It is taken generally in the direction of arrows 8—8 in FIG. 10.

In the jet setting illustrated by FIGS. 7, 9 and 11, spring 72 urges push button 64 outwardly to a position where the pins 78 and 80 abut the outer ends of slots 74 and 76 respectively, thus, limiting the outward extent of push button travel on the housing. If the push button is now pushed into the housing, pins 78 and 80 will travel along their respective slots 74 and 76. The motion of the two pins acts on the respective outriggers 84 and 88 in the following manner. Pin 78 pushes against the lefthand side of slot 82 as viewed in FIG. 9 to create a torque that turns vane element "B" clockwise. The clockwise motion thus imparted is transmitted via link 62 to vane elements "B" of the other vanes 45. Consequently, all vane elements "B" pivot in unison in the clockwise direction until they arrive at the position corresponding to the diffuse setting represented by FIGS. 8, 10 and 12.

Figure 10:
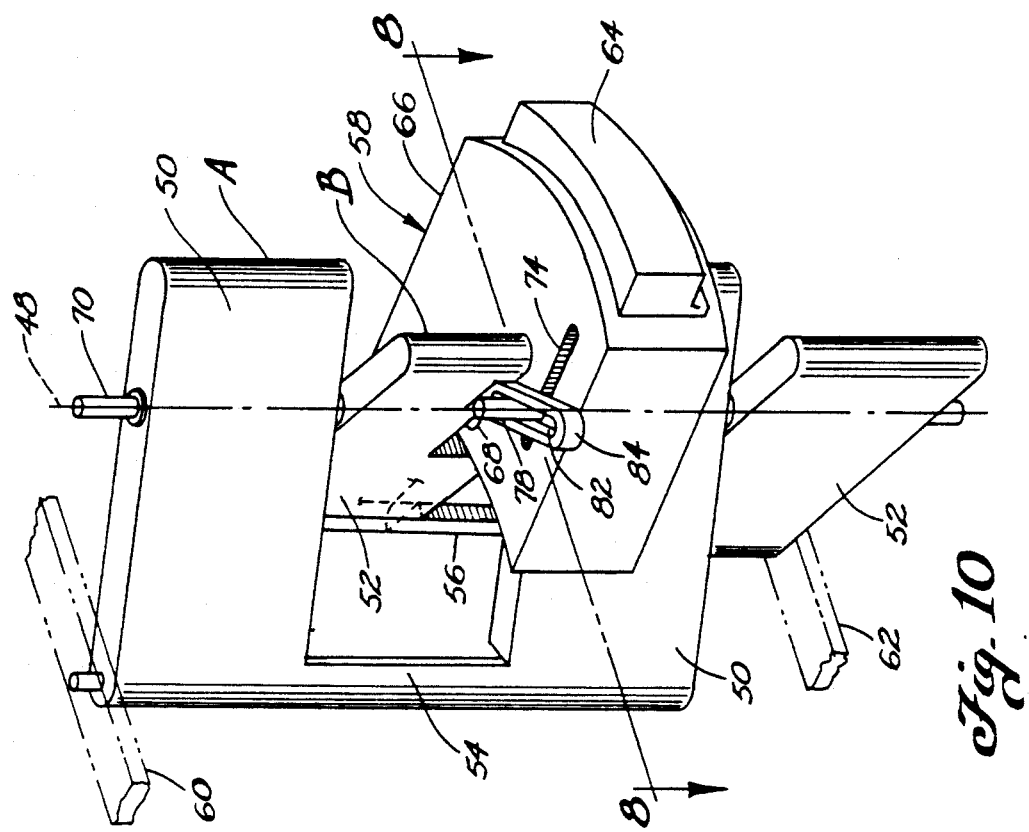
FIG. 10 is a perspective view of the center portion of the mechanism in the diffuse setting.

As the action of pin 78 operates vane elements "B", the action of pin 80 simultaneously operates the center vane 45's vane element "A" in the counterclockwise direction, and the remainder via link 60; until all vane elements "A" assume the position corresponding to the diffuse setting of FIGS. 8, 10 and 12. The motion of pin 80 acts on the sidewall of slot 86 of outrigger 88 to exert the pivot torque.

When push button 64 moves outwardly from the position of FIGS. 8, 10 and 12, pins 78 and 80 act via the other sides of slots 82 and 86 of outriggers 84 and 88 to return vane elements "A" and "B" to the jet setting of FIGS. 7, 9 and 11.

Control mechanism 58 includes a detent feature that causes push button 64 to remain in the diffuse setting once it has been sufficiently pushed into housing 58 to bring the vanes to the diffuse setting. The structure that provides the detent feature is depicted in FIGS. 11, 11A, 12, 12A, 13, 13A, and 14. The cross hatched portion of FIG. 11A represents a track 90 that is provided in the lower horizontal face of push button 64. The interior surface of the lower wall of housing 66 confronting the lower horizontal face of push button 64 comprises a transverse slot 92. The lower housing wall and the push button cooperatively define a recess within which a circular detent control disk 94 is disposed. Concentrically affixed to the center of disk 94 is a cylindrical pin 96 that projects on opposite sides of the disk. The lower portion of the pin 96 is disposed in slot 92 while the upper portion is disposed in track 90. The engagement of pin 96 with slot 92 constrains the control disk to tranverse motion.

In the jet setting, pin 96 is positioned at the inner end of track 90 as seen in FIG. 11A. As the push button is depressed, pin 96 travels relative to track 90 in the direction indicated by the arrows extending along the lefthand side of the track's edge. As the push button approaches the diffuse setting, a cam 98 in that lefthand edge of the track abuts pin 96 and begins camming the pin and control disk to the right. Continued inward travel of the push button causes pin 96 to enter a branch of track 90 that is designated by the numeral 100. (Slots 74 and 76 have sufficient length to allow for the relative travel of pin 96 into branch 100.) When the push button is released after pin 96 has entered branch 100, spring 72 is effective to urge the push button outwardly withdrawing pin 96 from branch 100. However, pin 96 is now tranversely aligned with a detent surface 102 that the pin will in fact contact as it exits branch 100. Pin 96 will therefore abut surface 102 and the detent surface will be effective to cause the pin to lodge in the detent's trough 104. Spring 72 will be unable to push the pin out of trough 104 by itself, and therefore the mechanism will remain in this position corresponding to the diffuse setting.

To release the detent, it is only necessary to depress the push button just enough to force pin 96 against a cam surface 106, shifting disk 94 still further to the right so that pin 96 enters another branch 108 of track 90. Release of the push button will now enable spring 72 to push it fully outwardly to the jet setting. As the push button travels toward the jet setting, pin 96 encounters a further cam surface 110 of track 90 which is effective to shift the detent control disk back to the FIG. 11A position as the jet setting is reached. FIGS. 12 and 12A show the control mechanism in the diffuse setting; FIGS. 13 and 13A show the mechanism in the condition at which the detent has been released.

When the mechanism is in the jet setting, control mechanism 58 may be pushed to the right or left to similarly direct the jet flow. Because of possible interference of the end vanes with the vertical sides of frame 46, the mechanism should be operated to the diffuse setting when the vanes are generally straight, such as in FIG. 4.

While a presently preferred embodiment of the invention has been illustrated and described, it should be appreciated that principles may be applied to other embodiments that fall within the scope of the following claims.

What is claimed is:

1. An air outlet register, such as for an instrument panel of an automotive vehicle, comprising a perimeter frame, a number of directional vanes mounted on said perimeter frame means for executing pivotal movement of each vane about a corresponding axis, these axes being a series of parallel axes, each of said vanes comprising a first vane element and a second vane element, first vane elements of said vanes collectively constituting a first vane element group and second vane elements of said vanes collectively constituting a second vane element group, a first linkage means linking first vane elements of said first vane element group, but not second vane elements of said second vane element group, such that first vane elements of said first vane element group are mutually parallel and remain so while executing pivotal movement in unison over a range of pivotal positions, a second linkage means linking second vane elements of said second vane element group, but not first vane elements of said first vane element group, such that second vane elements of said second vane element group are mutually parallel and remain so while executing pivotal movement in unison over said range of pivotal positions, and control means for selectively operatively relating first vane elements of said first vane element group and second vane elements of said second vane element group, said control means comprising a control mechanism that is selectively operable to two different positions and means operatively coupling said control mechanism with said first and second vane element groups such that when said control mechanism is in a first of its two positions, first and second vane elements of both said first and second vane element groups are caused to be mutually parallel and remain so while executing pivotal movement in unison, and when said control mechanism is in a second of its two positions, mutually parallel vane elements of said first vane element group are forced to be non-parallel to mutually parallel vane elements of said second vane element group, and in which said control means comprises a push-button operator having a detent that keeps the control mechanism in said second position until released.

2. An air outlet register as set forth in claim 1 in which said axes are disposed vertically in said perimeter frame.

3. An air outlet register as set forth in claim 1 in which each first vane element comprises two main vane element portions spaced from each other, each second vane element comprises two main vane element portions spaced from each other, and each vane comprises one of the two main vane element portions of its first vane element disposed between the two main vane element portions of its second vane element.

* * * * *